US008715555B2

(12) United States Patent
Love et al.

(10) Patent No.: US 8,715,555 B2
(45) Date of Patent: May 6, 2014

(54) SCAFFOLD PLANK AND PROCESS OF MAKING SAME

(75) Inventors: Ethan A. Love, Austin, TX (US);
Eugene J. Morgan, Colleyville, TX (US); Carol A. Schulz-Morgan, Colleyville, TX (US)

(73) Assignees: Eugene J. Morgan, Colleyville, TX (US); Carol A. Schulz-Morgan, Colleyville, TX (US)

(*) Notice: Subject to any disclaimer, the term of this patent is extended or adjusted under 35 U.S.C. 154(b) by 57 days.

(21) Appl. No.: 13/373,520

(22) Filed: Nov. 17, 2011

(65) Prior Publication Data

US 2012/0125716 A1    May 24, 2012

Related U.S. Application Data

(60) Provisional application No. 61/458,405, filed on Nov. 21, 2010.

(51) Int. Cl.
*B29C 70/02*    (2006.01)
(52) U.S. Cl.
USPC .................................. 264/171.26; 428/195.1

(58) Field of Classification Search
USPC ............... 264/171.13, 171.24, 171.26, 172.1, 264/211.24
See application file for complete search history.

(56) References Cited

U.S. PATENT DOCUMENTS

| 3,895,896 | A | * | 7/1975 | White et al. ..................... 425/93 |
| 3,983,668 | A | * | 10/1976 | Hassman ......................... 52/177 |
| 4,680,224 | A | * | 7/1987 | O'Connor .................. 428/298.1 |
| 4,681,722 | A | * | 7/1987 | Carter et al. ............. 264/171.11 |
| 5,492,583 | A | * | 2/1996 | Fingerson et al. ............ 156/180 |

OTHER PUBLICATIONS

Wu et al., Pultruded fiber-reinforced polyurethane-toughened phenolic resin, I, Die Angewandte Makromolekulare Chemie, 1996, vol. 235, pp. 35-45.*
1997 Annual Report for Scaffold Connection Corporation (a Canadian corporation, now bankrupt).
Novaplank brochure from the Scaffold Connection Corporation, Obtained Feb. 2013.
Novaplank brochure/flyer from Scaffold Connection Corporation, Obtained Feb. 2013.

* cited by examiner

*Primary Examiner* — Matthew Daniels

(57) ABSTRACT

The invention is a plank fabricated from a composite fiberglass material. The invention further comprises the method of making the composite fiberglass plank using a pultrusion process.

8 Claims, 5 Drawing Sheets

SCAFFOLD PLANK AND PROCESS OF MAKING SAME

CROSS REFERENCE TO RELATED APPLICATION

This Application claims priority to U.S. Provisional Patent Application Ser. No. 61/458,405 filed Nov. 21, 2010 entitled "IMPROVED SCAFFOLD PLANK AND PROCESS OF MAKING SAME".

FIELD OF THE INVENTION

This present invention is related to scaffolds and in particular, the planks used in scaffolds and a process of making same.

BACKGROUND

Scaffolding is a temporary structure used to support people and material in the construction or repair of buildings and other large structures. It is usually a modular system of metal pipes or tubes, although it can be made out of other materials. The basic materials are tubes, couplers and planks.

Planks provide a working surface for users of the scaffold. Conventionally, planks are made of seasoned wood and come in a variety of heights, are a standard width and are a maximum of 10 feet long. The board ends are protected by plates called hoop irons or nail plates, which are made of metal, steel or alloy steel.

Conventional scaffold planks are made of wood or lumber that over time, deteriorate. What is desired is a scaffold plank, and a process of making same, that overcomes the deficiencies of wood or lumber planks.

Fiberglass is a material made from extremely fine fibers of glass. It is used as a reinforcing agent for many polymer and plastic products; the resulting composite material, is known as fiber-reinforced plastic (FRP).

The types of fiberglass most commonly used are mainly E-glass (alumino-borosilicate glass with a small amount of alkali oxides, mainly used for glass-reinforced plastics), but also A-glass (alkali-lime glass with little or no boron oxide), E-CR-glass (alumino-lime silicate with a small amount of alkali oxides, has high acid resistance), C-glass (alkali-lime glass with high boron oxide content, used for example for glass staple fibers), D-glass (borosilicate glass with high dielectric constant), R-glass (alumino silicate glass without MgO and CaO with high mechanical requirements), and S-glass (alumino silicate glass without CaO but with high MgO content with high tensile strength).

The basis of textile-grade glass fibers is silica, SiO2. In its pure form it exists as a polymer, (SiO2)n. It has no true melting point but softens at 2,000° C. (3,630° F.), where it starts to degrade. At 1,713° C. (3,115° F.), most of the molecules can move about freely. If the glass is then cooled quickly, it will not form an ordered structure. In the polymer, it forms SiO4 groups that are configured as a tetrahedron with the silicon atom at the center and four oxygen atoms at the corners. These atoms then form a network bonded at the corners by sharing the oxygen atoms.

Although pure silica is a perfectly viable glass and glass fiber, it must be worked with at very high temperatures, which is a drawback unless its specific chemical properties are needed. It is usual to introduce impurities into the glass in the form of other materials to lower its working temperature. These materials also impart various other properties to the glass that may be beneficial in different applications. The first type of glass used for fiber was soda lime glass or A glass but it was not very resistant to alkali. A new type of glass, E-glass, was formed. E-glass is an alumino-borosilicate glass that is substantially alkali free (<2%). This was the first glass formulation used for continuous filament formation.

The letter E is used because it was originally for electrical applications. S-glass is a high-strength formulation for use when tensile strength is the most important property. C-glass was developed to resist attack from chemicals, mostly acids that destroy E-glass. T-glass is a North American variant of C-glass. A-glass is an industry term for cullet glass, often bottles, made into fiber. AR-glass is alkali-resistant glass. Most glass fibers have limited solubility in water but are very dependent on pH.

Chloride ions will attack and dissolve E-glass surfaces. Since E-glass does not melt, but softens, the softening point is defined as "the temperature at which a 0.55-0.77 mm diameter fiber 235 mm long, elongates under its own weight at 1 mm/min when suspended vertically and heated at the rate of 5° C. per minute". The strain point is reached when the glass has a viscosity of 1014.5 poise. The annealing point, which is the temperature where the internal stresses are reduced to an acceptable commercial limit in 15 minutes, is marked by a viscosity of 1013 poise.

Occupational Safety and Health Administration (OSHA) Regulation set forth at 29 CFR 1926.451 discusses scaffold requirements. It provides, except as otherwise provided, a scaffold and scaffold component shall be capable of supporting, without failure, its own weight and at least 4 times the maximum intended load applied or transmitted to it. Much or the load is applied to the planks. Applied loads are measured in pounds per square foot (psf).

SUMMARY

The invention is a plank constructed from a composite fiberglass material. The invention further comprises the method of making the composite fiberglass plank. To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

DESCRIPTION OF THE DRAWINGS

A more complete understanding of the present invention may be obtained by reference to the following Detailed Description, when taken in conjunction with the accompanying Drawings, wherein.

DETAILED DESCRIPTION

The invention will now be described more fully with reference to the accompanying drawings, in which the invention is shown. The invention may, however, be embodied in many different forms and should not be construed as limited to the embodiments set forth herein; rather, these embodiments are provided so that this disclosure will be thorough and complete, and will fully convey the scope of the invention to those skilled in the art.

The invention is a plank constructed from a composite fiberglass material. The invention further comprises the method of making the composite fiberglass plank. Advantageously, it eliminates problems associated with the deterioration of a wood or lumber plank such as excessive water absorption, split ends, rotting, termite infestation and reduced strength due to long term use.

Figure 1:
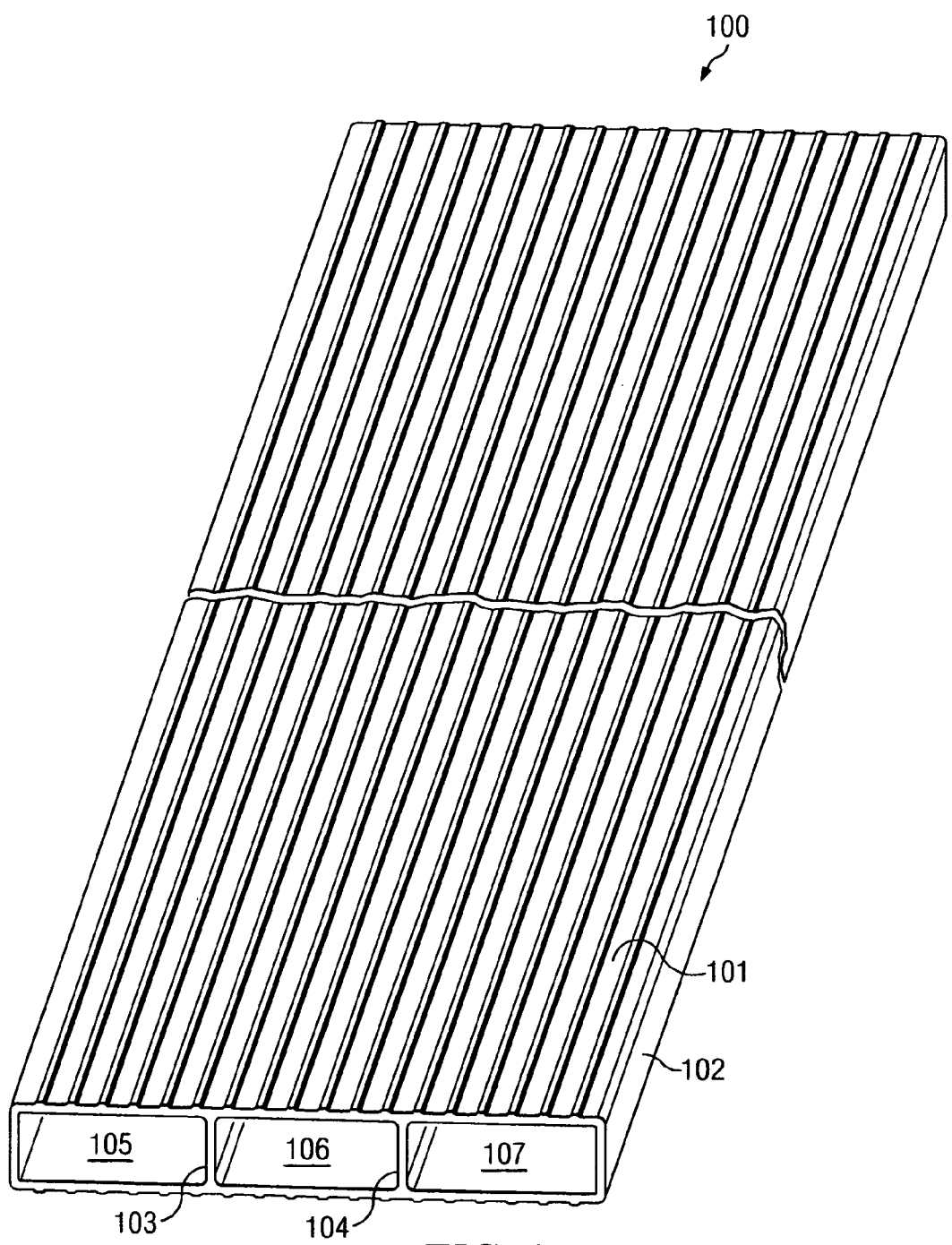
FIG. 1 is a perspective view of the invention.
Figure 2:
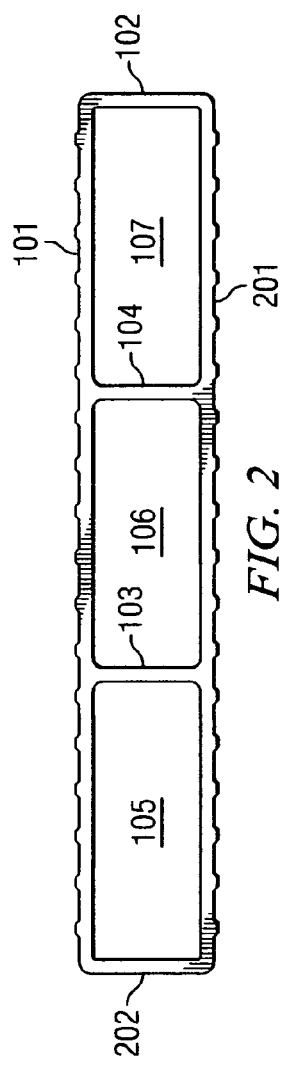
FIG. 2 is a cross-sectional view of the invention.

FIG. 1 illustrates the invention 100, a plank for use in a scaffold system, comprising a substantially rectangular cuboid having a length, width and depth, fabricated from a plastic and fiberglass composite material. More specifically, it comprises a rectangular cuboid having an outer top panel 101, an outer bottom panel (out of view), an outer left panel (out of view) and an outer right panel 102, said panels being along the length and height of the plank. The invention further comprises at least one wall within the interior of the plank spanning the height and length of the plank, forming at least one hollow, interior void. Alternatively, the invention has a wall within the interior of the plank spanning the height and length of the plank, serving as a rib and forming two hollow, interior voids therein. Alternatively yet, as seen in FIG. 1, the invention has two walls 103, 104 within the interior of the plank spanning the height and length of the plank, serving as ribs and forming three hollow, interior voids 105, 106, 107 therein. This is also seen in cross-section view of FIG. 2. Outer bottom panel 201 and outer left panel 202 are seen in FIG. 2. Formed on at least one of the outer top layer and outer bottom layer a slip-resistant ridged surface. Such surfaces are seen in FIGS. 1 and 2. The invention is fabricated of a fiber-reinforced plastic (FRP) or glass-reinforced plastic (GRP).

Figure 3:
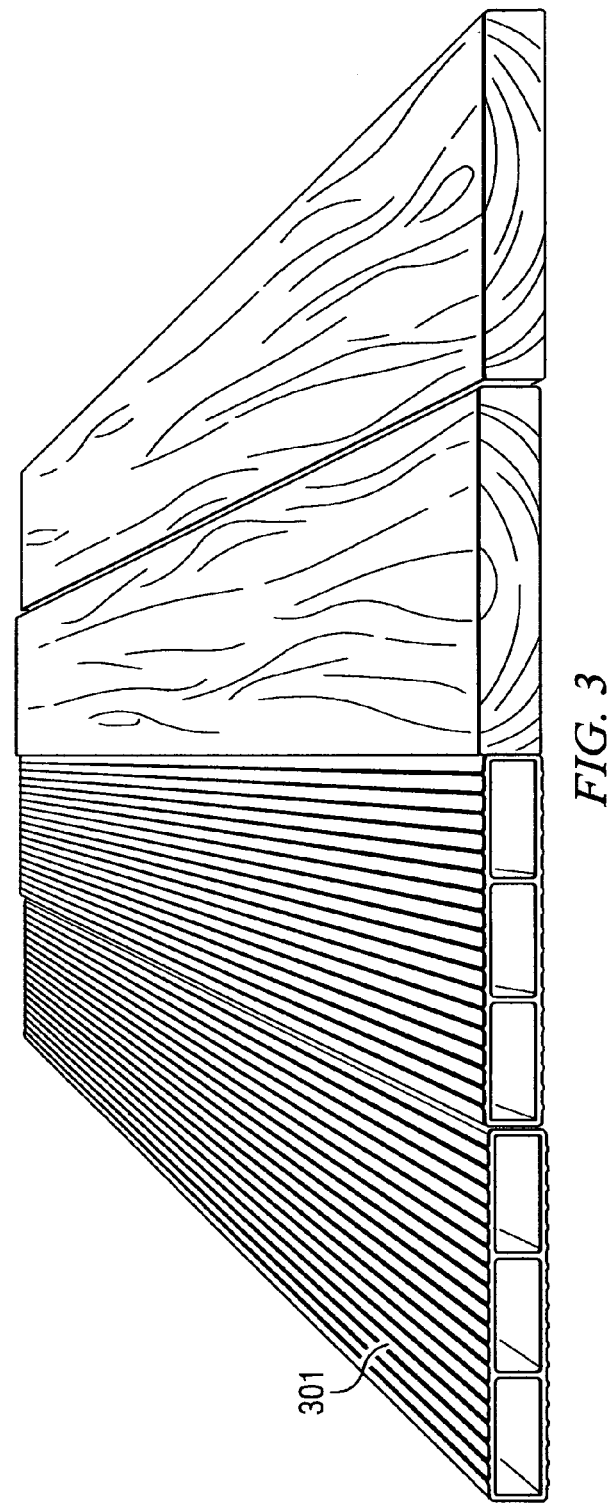
FIG. 3 is a conventional wood plank side by side with the invention.
Figure 4:
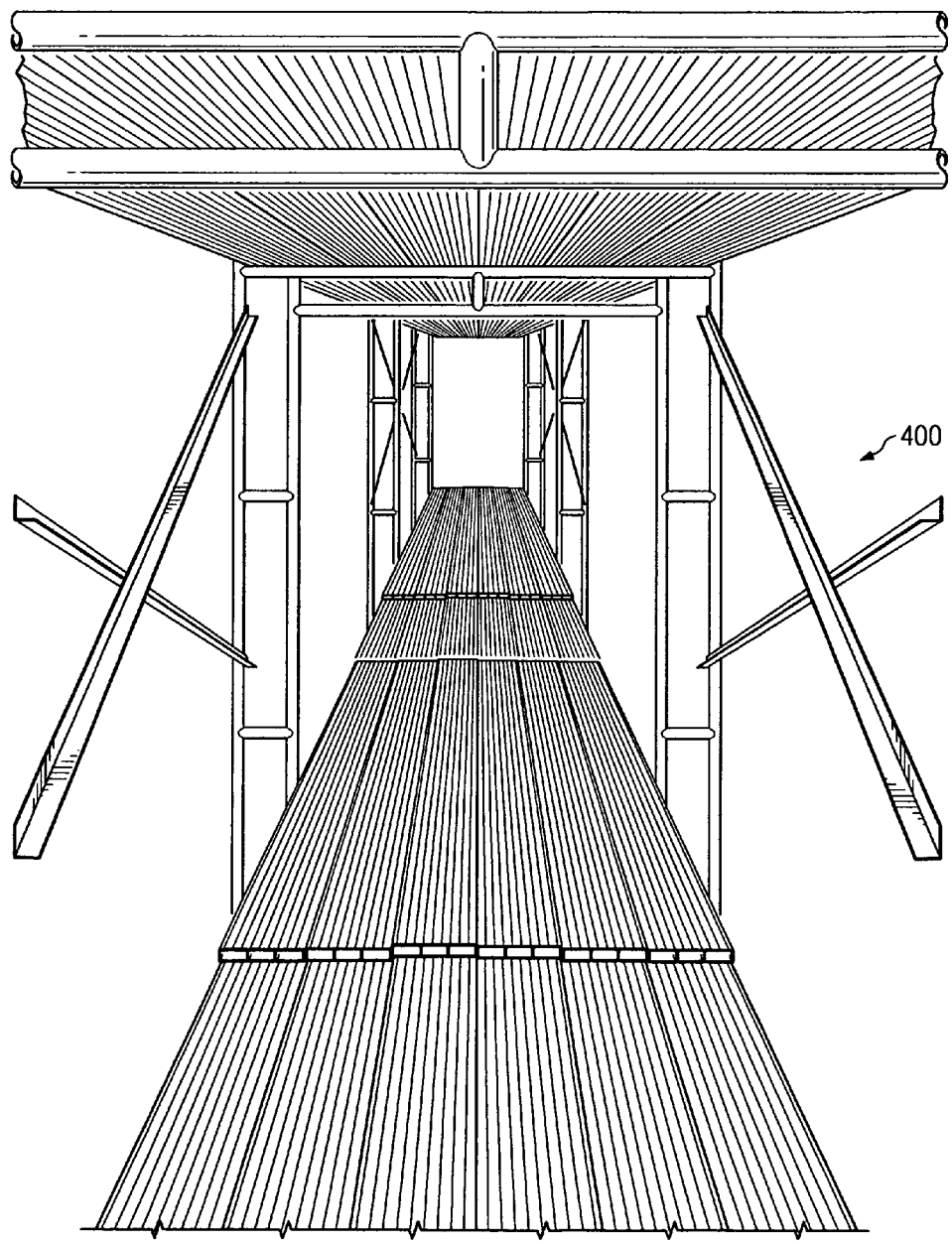
FIG. 4 is a view of the invention used in a scaffold.

The pultruded glass fiber reinforced structure of the invention has a number of advantages over timber in many structural applications. The invention will not rot or decay and is not susceptible to insect attack. Unlike wood, the invention requires no environmentally unfriendly preservatives or repellants, does not absorb any significant amount of water and is consistent in strength and appearance piece-to-piece. Pultruded fiberglass is stronger, more rigid and lighter weight than structural timber. FIG. 3 shows a conventional wood plank side by side with the invention 301 in a scaffold. FIG. 4 is a view of the invention used in a scaffold 400.

Figure 5:
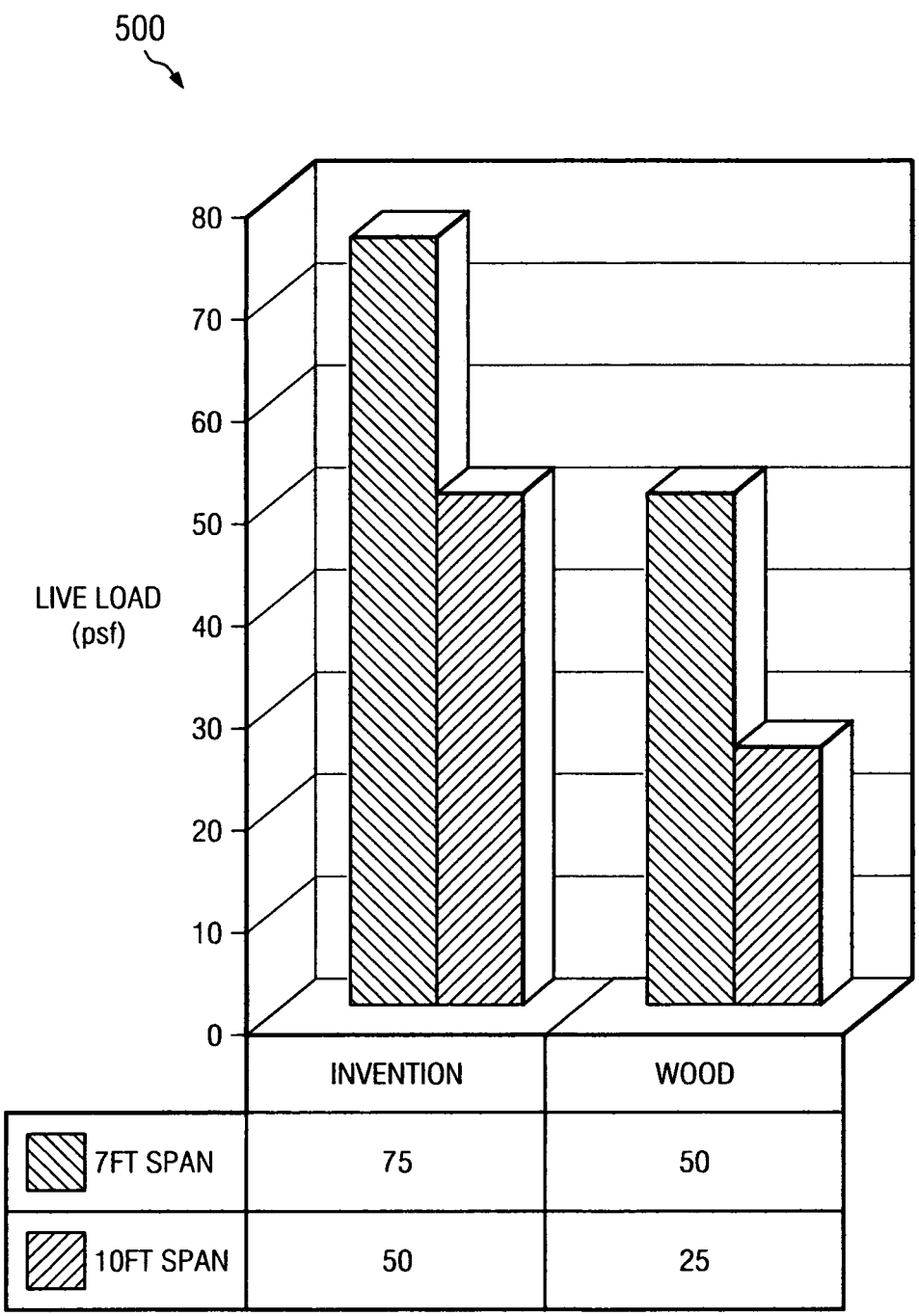
FIG. 5 is a chart comparing the strength of the invention with that of a conventional wood plank.

FIG. 5 is a chart 500 comparing the strength of the invention with that of a conventional wood plank. The invention will return to its original shape after use unless the plank has been overloaded to the point of failure. As seen therein, an embodiment of the invention is load rated at 75 psf for spans 7 feet or less and 50 psf for spans 10 feet or less. These performance figures are based on OSHA regulations.

The invention is up to 35% lighter than wood products, does not splinter; and requires minimal inspection time. Unlike wood products, the invention does not require special storage requirements. One embodiment of the invention has the same dimensions as a conventional a 2"×10" scaffold grade wood plank. The invention is used in a manner similar to a conventional wood scaffold plank but is a safer, more durable alternative.

The invention further comprises the process of the manufacturing a plank using a fiberglass pultrusion process in which a stainless steel chrome die is used to create the shaped perimeter along with steel mandrels to create internal voids and ribs.

More specifically, a described embodiment of the invention is Applicant's 1.5"×9.5" FRP NexgenPlank™ scaffold plank. The process of the invention utilizes a pultrusion process. Pultrusion is a continuous process by which glass fiber reinforcements and liquid plastic resin are pulled through and cured by a heated die to form the final shape.

Figure 6:
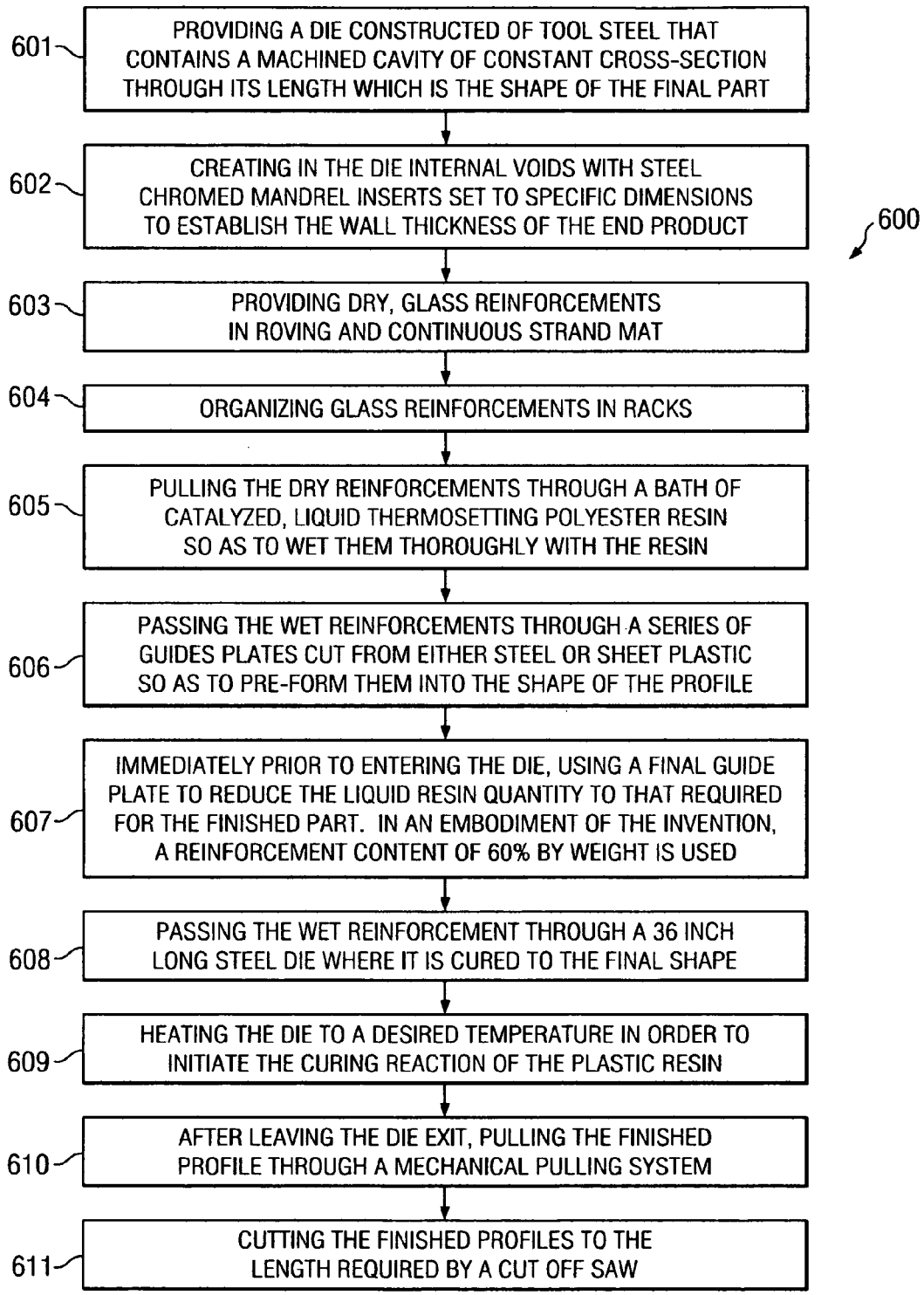
FIG. 6 is a flow chart of the process of making the invention.

Referring to FIG. 6, the method of the invention 600 begins providing a die constructed of tool steel that contains a machined cavity of constant cross-section through its length which is the shape of the final part 601 and creating in the die internal voids with steel chromed mandrel inserts set to specific dimensions to establish the wall thickness of the end product 602. The material is then introduced with dry, glass reinforcements in both roving (long, continuous strands which run the length of the part) and continuous strand mat (randomly oriented felt roll materials which are applied to the surfaces) 603. These are organized in racks to allow them to be introduced into the process where needed and to allow the operators to replenish them as required 604.

The dry reinforcements are pulled through a bath of catalyzed, liquid thermosetting polyester resin in order to wet them thoroughly with the resin 605. The wet reinforcements are then passed through a series of guides plates cut from either steel or sheet plastic in order to pre-form them into the shape of the profile 606. Additionally, the guide system functions to strip away excess quantities of the liquid resin. Immediately prior to entering the die, a final guide plate is used to reduce the liquid resin quantity to that required for the finished part 607. In an embodiment the invention, a reinforcement content of 60% by weight is used.

The wet reinforcement then passes through a 36 inch long steel die where it is cured to the final shape 608. As noted above, the die is constructed of tool steel and contains a machined cavity of constant cross-section through its length which is the shape of the final part. The die cavity is hard chrome plated and polished for wear resistance and incorporates a custom designed ridged pattern for a slip-resistant surface on the 9.5" sides. Internal voids are created with steel chromed mandrel inserts set to specific dimensions to establish constant wall thickness of the end product. This die is heated to 275° F. using electric resistance heaters and a controller in order to initiate the curing reaction of the plastic resin 609. During the passage through the die, the resin temperature rises until the catalyst is activated, resulting in a cross linking reaction of the resin which transforms it from a liquid to a hard solid. This reaction occurs within the confines of the die and is complete by the time it reaches the die exit.

After leaving the die exit, the finished profile runs through a mechanical pulling system 610. It is this pulling system which powers the pultrusion process, pulling the reinforcement through the die as described above. The finished profiles are then cut to the length required by a cut off saw 611. After completion of the process, the invention is ready for use with no further processing required.

The invention produces a smaller carbon footprint compared to a conventional wood product and requires minimal inspection prior to use. Embodiments of the invention can be manufactured in any standard length (4', 6', 8', 10', 12' and 16') as well as in specialty sizing available for special applications.

The embodiments shown and described above are only exemplary. Even though numerous characteristics and advantages of the invention have been set forth in the foregoing description together with details of the invention, the disclosure is illustrative only and changes may be made within the principles of the invention to the full extent indicated by the broad general meaning of the terms used herein.

What is claimed is:

1. A method of manufacturing a plank in a fiberglass pultrusion process, comprising the steps of:

providing a stainless steel die coated in chrome that contains a machined cavity of constant cross-section through its length which is the shape of the final part having incorporated in the stainless steel die a ridged pattern for a slip-resistant surface;

creating in the die internal voids with mandrel inserts set to specific dimensions to establish interior wall thickness of the end product;

providing dry, glass reinforcements in roving and continuous strand mat;

organizing the dry, glass reinforcements in roving and continuous strand mat in racks;

pulling the dry, reinforcements in roving and continuous strand mat through a bath of catalyzed, liquid thermosetting polyester resin so as to wet them thoroughly with the resin;

passing the wet reinforcements through a series of guide plates cut from either steel or sheet plastic so as to pre-form them into the shape of the profile;

immediately prior to entering the stainless steel die, using a final guide plate to reduce the liquid resin quantity to that required for the finished part;

passing the wet reinforcement through the stainless steel die where it is cured to the final shape;

heating the stainless steel die to a desired temperature in order to initiate the curing reaction of the plastic resin; and after leaving the stainless steel die exit, pulling the finished profile through a mechanical pulling system.

2. The method of claim 1, further comprising the step of cutting the finished profile to the length required by a cut off saw.

3. The method of claim 1, wherein a reinforcement content of 60% by weight is used.

4. The method of claim 1, wherein the series of guide plates function to strip away excess quantities of the liquid resin.

5. The method of claim 1, wherein the stainless steel die is 36 inches long.

6. The method of claim 1, wherein the stainless steel die is heated to 275° F.

7. The method of claim 6, wherein the heating is performed using at least one electric resistance heater and a controller in order to initiate the curing reaction of the plastic resin.

8. The method of claim 1, wherein the die cavity is hard chrome plated and polished for wear resistance.

* * * * *